United States Patent
Nelson et al.

(10) Patent No.: US 11,480,542 B2
(45) Date of Patent: Oct. 25, 2022

(54) PARTICULATE MATTER SENSOR AND ELECTRODE PATTERN THEREOF

(71) Applicant: DELPHI TECHNOLOGIES IP LIMITED, St. Michael (BB)

(72) Inventors: Charles S. Nelson, Fenton, MI (US); Gopinath Penamalli, Bangalore (IN)

(73) Assignee: Delphi Technologies IP Limited, St. Michael (BB)

( * ) Notice: Subject to any disclaimer, the term of this patent is extended or adjusted under 35 U.S.C. 154(b) by 455 days.

(21) Appl. No.: 16/696,417

(22) Filed: Nov. 26, 2019

(65) Prior Publication Data

US 2021/0156816 A1 May 27, 2021

(51) Int. Cl.
*G01N 27/407* (2006.01)
*F01N 13/00* (2010.01)

(52) U.S. Cl.
CPC ....... *G01N 27/4073* (2013.01); *F01N 13/008* (2013.01); *F01N 2560/05* (2013.01)

(58) Field of Classification Search
CPC ............ F01N 2560/05; G01N 27/4075; G01N 2015/0046
See application file for complete search history.

(56) References Cited

U.S. PATENT DOCUMENTS

| | | | |
|---|---|---|---|
| 4,300,990 A | 11/1981 | Maurer | |
| 6,238,536 B1 | 5/2001 | Lundgren et al. | |
| 6,557,393 B1 | 5/2003 | Gokhfeld et al. | |
| 9,134,216 B2 | 9/2015 | Hedayat et al. | |
| 9,389,163 B2 | 7/2016 | Hedayat et al. | |
| 9,696,249 B2 | 7/2017 | Hedayat et al. | |
| 9,841,357 B2* | 12/2017 | Zhang | .................. F01N 3/0814 |
| 10,024,260 B2* | 7/2018 | Zhang | ................. F02D 41/1466 |
| 10,274,400 B2* | 4/2019 | Zhang | ................ G01N 15/0606 |
| 11,243,157 B2* | 2/2022 | Asm | .................... F02D 41/1466 |
| 2008/0190173 A1* | 8/2008 | Wienand | ............ G01N 15/0656 422/68.1 |
| 2009/0051376 A1 | 2/2009 | Schnell et al. | |
| 2011/0203348 A1* | 8/2011 | Hedayat | ............ G01N 15/0656 73/23.33 |
| 2011/0248363 A1* | 10/2011 | Fujii | ..................... G01L 9/0005 257/E21.09 |
| 2011/0259079 A1 | 10/2011 | Maeda et al. | |

(Continued)

*Primary Examiner* — Anthony Ayala Delgado
(74) *Attorney, Agent, or Firm* — Joshua M. Haines

(57) ABSTRACT

A particulate matter sensor includes a shield through which exhaust gases flow in a direction of flow from upstream to downstream. A sensing element with a positive electrode and a negative electrode separated from the positive electrode by an electrode gap is located within the shield. The positive electrode includes a plurality of positive electrode branches each having positive electrode extensions extending downstream and separated from each other by positive electrode slots. A positive electrode extension tip for each has a positive electrode extension tip width. The negative electrode includes negative electrode branches each having negative electrode extensions extending upstream which are each flanked on each side thereof by a plurality of negative electrode slots. A negative electrode extension tip for each has a negative electrode extension tip width. A sum of the positive electrode extension tip widths is greater than a sum of the negative electrode extension tip widths.

5 Claims, 7 Drawing Sheets

(56) References Cited

U.S. PATENT DOCUMENTS

| | | | |
|---|---|---|---|
| 2012/0085146 A1* | 4/2012 | Maeda | G01N 27/043 73/23.31 |
| 2012/0103058 A1 | 5/2012 | Maeda et al. | |
| 2015/0355067 A1* | 12/2015 | Zhang | G01N 15/0656 73/23.31 |
| 2016/0131013 A1* | 5/2016 | Yi | F01N 13/08 60/276 |
| 2016/0223432 A1* | 8/2016 | Kubinski | F01N 3/027 |
| 2017/0146430 A1* | 5/2017 | Zhang | G01N 15/0606 |
| 2017/0307499 A1* | 10/2017 | Tiefenbach | G01M 15/102 |
| 2017/0315042 A1 | 11/2017 | Miyagawa et al. | |

* cited by examiner

PARTICULATE MATTER SENSOR AND ELECTRODE PATTERN THEREOF

TECHNICAL FIELD OF INVENTION

The present disclosure relates to particulate matter sensors for sensing the amount of particulate matter or soot in the exhaust conduit of an internal combustion engine; and more particularly to a pattern of a positive electrode and a negative electrode which promotes accumulation of particulate matter.

BACKGROUND OF INVENTION

Knowing the amount of particulate matter or soot present in the exhaust stream of a diesel engine is important for determining the operational state of an exhaust gas treatment device, for example, a diesel particulate filter. A particulate matter sensor is often placed in the exhaust conduit in order to sense the amount of particulate matter present in the exhaust stream. The amount of particulate matter sensed by the particulate matter sensor may then be used, for example, to determine if the diesel particulate filter has failed and is therefore emitting a greater amount of particulate matter than is allowed.

A typical particulate matter sensor uses a simple resistive device as the sensing element. The sensing element typically includes a non-conductive substrate, most often alumina or zirconia, and two conductive electrodes that may be made of a precious metal. The two electrodes may be formed in a pattern such that the two electrodes are separated from each other by an electrode gap. When the sensing element is disposed in the exhaust stream of a diesel engine, particulate matter will deposit thereupon and cause a high resistance short between the electrodes, thereby lowering the resistance between the two electrodes. The more particulate matter that is allowed to collect on the sensing element, the more the resistance between the two electrodes will decrease. The sensing element may be provided with a heater on the side opposite the electrodes in order to clean soot off of the electrodes when desired.

Many different patterns for the two electrodes have been published where many patterns seek to maximize the length of the electrode gap in order to provide as much area as possible for particulate matter to bridge the electrode gap. One such example is shown in United States Patent Application Publication No. US 2009/0051376 A1 to Schnell et al. While Schell et al. may provide a pattern of interdigitized electrodes which results in a long electrode gap, in use, much of the length of the electrode gap does not accumulate particulate matter, thereby increasing the response time of the particulate matter sensor. However, in order to improve, by way of non-limiting example only, diagnosis of the operation of a particulate filter in the exhaust stream of an internal combustion engine, engine and vehicle manufacturers are desiring ever-decreasing response times from the particulate matter sensor. As used herein, response time is the time required for a regenerated particulate matter sensor to reach a predetermined resistance threshold when exposed to a gas stream containing a fixed concentration of particulate matter and flowing at a predetermined velocity. At present time, many commercially available particulate matter sensors have response times of around 330 seconds and the fastest particulate matter sensors have a response time of 143 seconds, however, engine and vehicle manufacturers desire to have a response time of 110 seconds or less where each of the response times mentioned herein are based on the same concentration of particulate matter, predetermined velocity, and resistance threshold.

What is needed is a particulate matter sensor which minimizes or eliminates one or more of the aforementioned shortfalls.

SUMMARY OF THE INVENTION

Briefly described, a particulate matter sensor is provided for sensing particulate matter present in exhaust gasses flowing in an exhaust conduit for an internal combustion engine. The particulate matter sensor includes a shield with a chamber therein, the shield having an inlet through which exhaust gases enter the chamber and an outlet through which exhaust gases exit the chamber such that exhaust gases pass from the inlet to the outlet in a direction of flow through the shield from upstream to downstream. The particulate matter sensor also includes a sensing element having a positive electrode and a negative electrode located within the shield between the inlet and the outlet such that the positive electrode is separated from the negative electrode by an electrode gap which electrically isolates the positive electrode from the negative electrode. The positive electrode includes a plurality of positive electrode branches arranged in rows across the direction of flow through the shield and including a plurality of positive electrode extensions extending downstream therefrom such that the plurality of positive electrode extensions are separated from each other by a plurality of positive electrode slots and such that each of the plurality of positive electrode extensions extends to a positive electrode extension tip having a positive electrode extension tip width in a direction perpendicular to the direction of flow through the shield. The negative electrode includes a plurality of negative electrode branches arranged in rows across the direction of flow through the shield alternating with the plurality of positive electrode branches and including a plurality of negative electrode extensions extending upstream therefrom such that the plurality of negative electrode extensions are each flanked on each side thereof in a direction perpendicular to the direction of flow through the shield from each other by a plurality of negative electrode slots and such that each of the plurality of negative electrode extensions extends to a negative electrode extension tip having a negative electrode extension tip width in a direction perpendicular to the direction of flow through the shield. Each one of the plurality of positive electrode extensions extends into a respective one of the plurality of negative electrode slots and each one of the plurality of negative electrode extensions extends into a respective one of the plurality of positive electrode slots. A sum of the positive electrode extension tip width for the plurality of positive electrode extensions is greater than a sum of the negative electrode extension tip width for the plurality of negative electrode extensions. The particulate matter sensor with the positive electrode and the negative electrode as described herein increases the effectiveness of particulate matter accumulation, thereby minimizing response time of the particulate matter sensor.

BRIEF DESCRIPTION OF DRAWINGS

This invention will be further described with reference to the accompanying drawings in which.

DETAILED DESCRIPTION OF INVENTION

Figure 1:
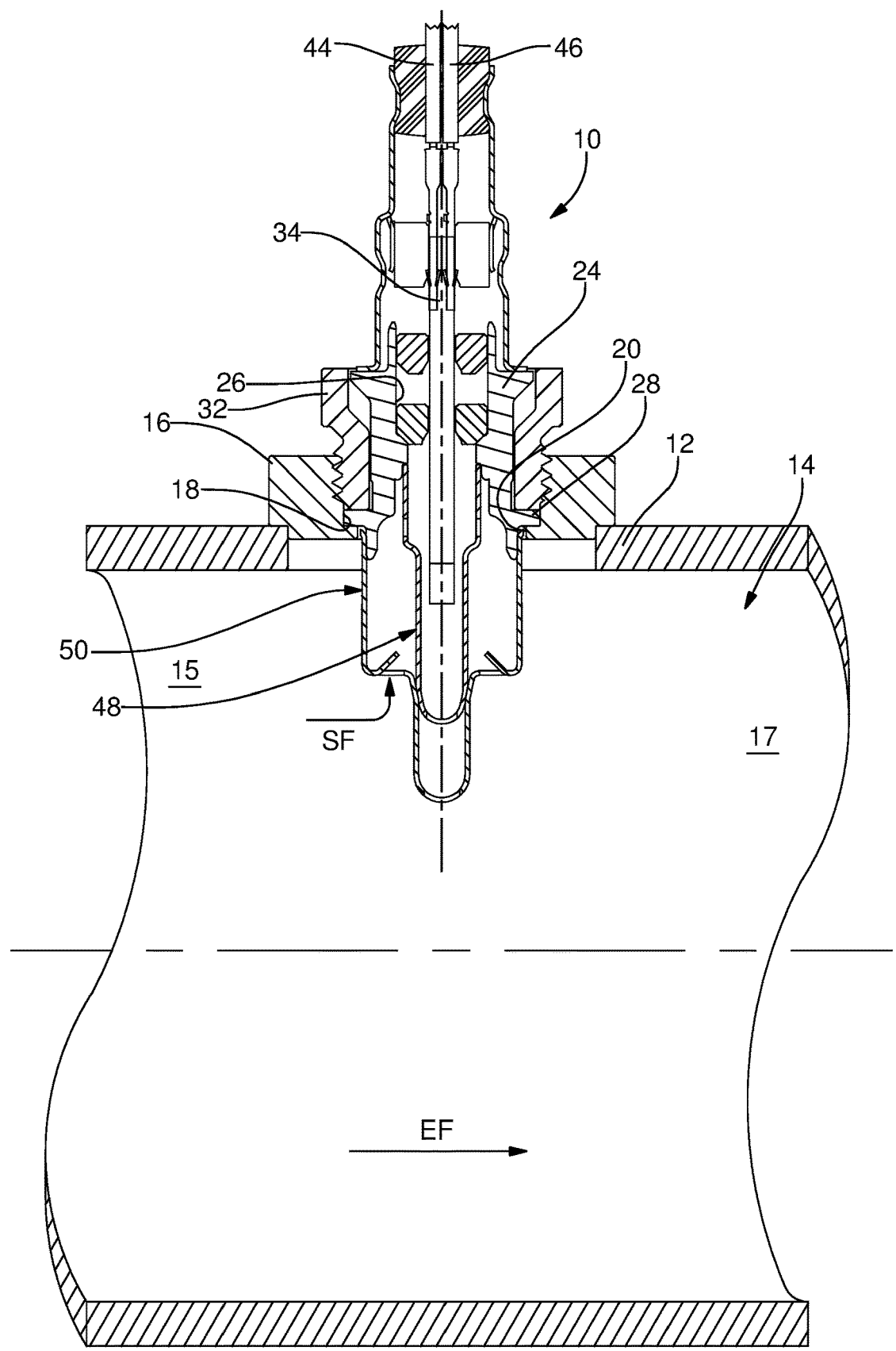
FIG. 1 is an axial cross-section of a particulate matter sensor in accordance with the present disclosure installed in an exhaust conduit.

In accordance with a preferred embodiment of this disclosure and referring initially to FIG. 1, a particulate matter sensor 10 is shown installed through an exhaust conduit wall 12 of an exhaust conduit 14 having an upstream end 15 for receiving exhaust gases from an internal combustion engine (not shown) and a downstream end 17 for communicating exhaust gases out of exhaust conduit 14 to the atmosphere. Exhaust conduit wall 12 includes a mounting boss 16 extending therethrough for installing particulate matter sensor 10 therein. Mounting boss 16 includes a stepped bore 18 for receiving particulate matter sensor 10 therein. Mounting boss 16 also includes a through bore 20 extending from the bottom of stepped bore 18 to allow particulate matter sensor 10 to extend into the interior of exhaust conduit 14.

Particulate matter sensor 10 includes a housing 24 with a housing longitudinal bore 26 extending therethrough. Housing 24 includes a radial flange 28 extending radially outward therefrom such that radial flange 28 axially positions particulate matter sensor 10 within stepped bore 18 of mounting boss 16.

A retainer nut 32 is threadably engaged with stepped bore 18 for retaining particulate matter sensor 10 to mounting boss 16. Radial flange 28 is axially captured between retainer nut 32 and stepped bore 18 such that when retainer nut 32 is tightened, particulate matter sensor 10 is securely held to mounting boss 16. In an alternative arrangement, retainer nut 32 may be omitted and housing 24 may directly threadably engage stepped bore 18 for retaining particulate matter sensor 10 to mounting boss 16.

Figure 5:
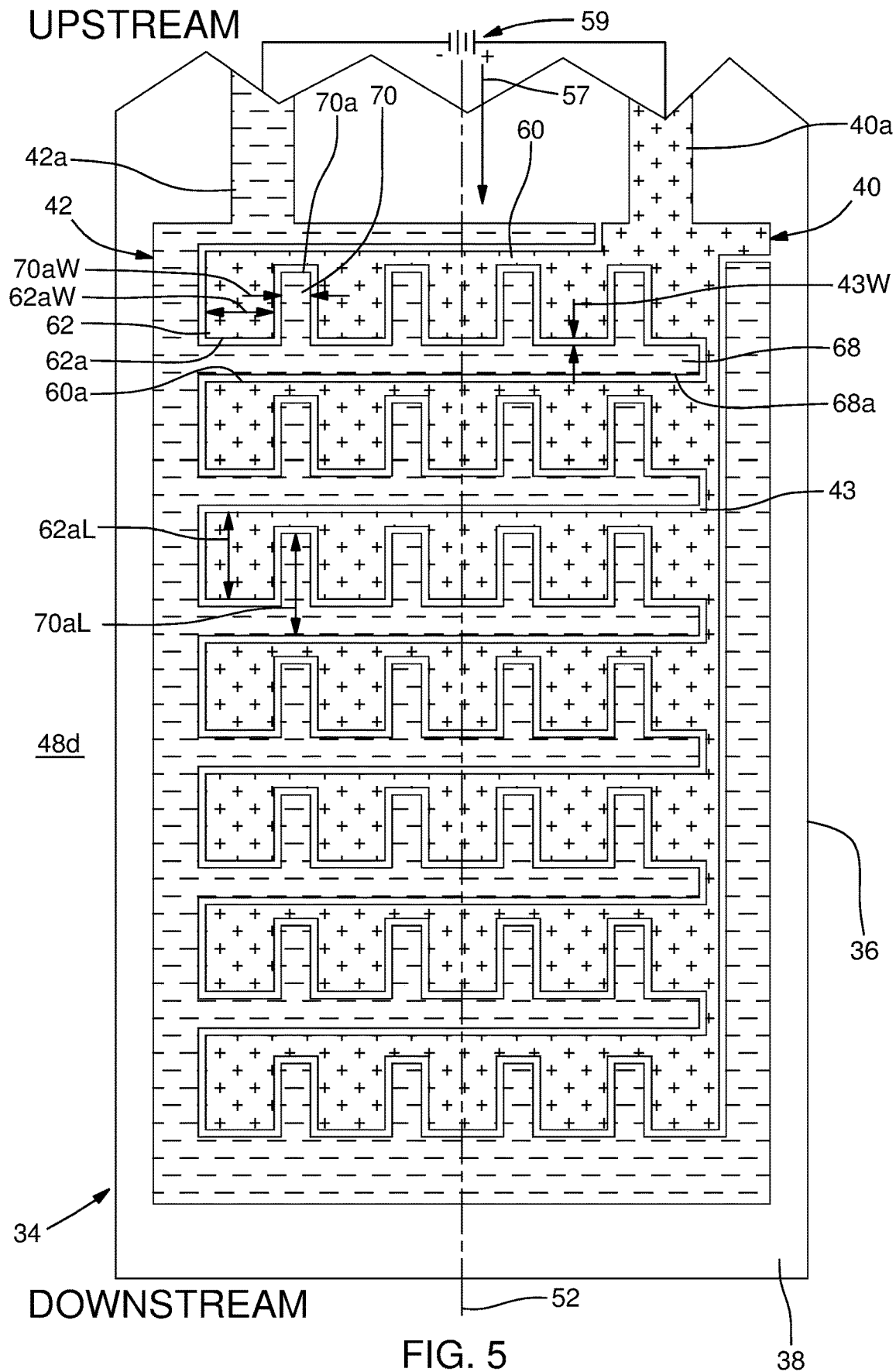
FIG. 5 is an enlarged view of a portion of a sensing element of the particulate matter sensor.

Now referring to FIGS. 1 and 5, a sensing element 34 is disposed in housing longitudinal bore 26 and extends axially from particulate matter sensor 10 radially into exhaust conduit 14. Sensing element 34 also preferably extends radially outside exhaust conduit 14. Sensing element 34 includes a non-conductive substrate 36 with a sensing face 38. A positive electrode 40 and a negative or neutral electrode 42, hereinafter referred to as negative electrode 42, are disposed on sensing face 38 such that positive electrode 40 and negative electrode 42 are located within exhaust conduit 14. Positive electrode 40 and negative electrode 42 are separated from each other by an electrode gap 43 which electrically isolates positive electrode 40 and negative electrode 42. Although not shown, a heating element may be disposed on the face opposite sensing face 38 in order to clean soot off positive electrode 40 and negative electrode 42 when desired. A positive electrode lead 40a is located on sensing face 38 in electrical communication with positive electrode 40 such that positive electrode lead 40a extends outside of exhaust conduit 14 where positive electrode lead 40a is electrically connected to a first wire 44 which extends to an engine control module (not shown). Similarly, a negative electrode lead 42a is located on sensing face 38 in electrical communication with negative electrode 42 such that negative electrode lead 42a extends outside of exhaust conduit 14 where negative electrode lead 42a is electrically connected to a second wire 46 which extends to the engine control module. In use, particulate matter is collected and bridges across electrode gap 43, thereby changing the resistance and conductance between positive electrode 40 and negative electrode 42. First wire 44 and second wire 46 provide a signal to the engine control module which is indicative of the amount of particulate matter that has collected and bridged across electrode gap 43 from positive electrode 40 to negative electrode 42. Positive electrode 40 and negative electrode 42 are provided in a pattern, as will be described in greater detail later, which promotes accumulation of particulate matter, thereby reducing the response time of particulate matter sensor 10.

Now referring to FIGS. 1-4, an inner shield 48 and an outer shield 50 will now be described. Inner shield 48 and outer shield 50 work collectively to provide protection to sensing element 34 from undesirable contaminates in the exhaust stream, for example liquid water, while providing desired flow of exhaust gases containing particulate matter to be sensed by positive electrode 40 and negative electrode 42.

Outer shield 50 is tubular and extends from an outer shield first end 50a to an outer shield second end 50b along an axis 52 such that outer shield 50 comprises an outer shield wall 50c which circumferentially surrounds axis 52, thereby defining an outer shield chamber 50d therewithin. Outer shield first end 50a is proximal to housing 24 and is fixed thereto, by way of non-limiting example only, by one or more of interference fit, welding, crimping, and the like. Outer shield wall 50c includes an outer shield wall upper portion 50e which is cylindrical and centered about axis 52 such that outer shield wall upper portion 50e has an outer shield first inside diameter 50eID and an outer shield first outside diameter 50eOD. Outer shield wall upper portion 50e extends from outer shield first end 50a to an outer shield wall inlet portion 50f which is traverse to axis 52 and which is preferably perpendicular to axis 52 such that outer shield wall inlet portion 50f extends radially inward from outer shield wall upper portion 50e, and in this way, outer shield wall inlet portion 50f is annular in shape. Outer shield wall inlet portion 50f is delimited radially inward by an outer shield wall lower portion 50g which is cylindrical and centered about axis 52 and which extends axially therefrom in a direction opposite from outer shield wall upper portion 50e and terminates at outer shield second end 50b. As illustrated in the figures, outer shield wall inlet portion 50f joins outer shield wall upper portion 50e and outer shield wall lower portion 50g. Outer shield wall lower portion 50g has an outer shield second inside diameter 50gID and an outer shield second outside diameter 50gOD such that outer shield second inside diameter 50gID is less than outer shield first inside diameter 50eID and such that outer shield second outside diameter 50gOD is less than outer shield first outside diameter 50gID.

An outer shield inlet, illustrated as a plurality of outer shield inlet apertures 50h, extends through outer shield wall inlet portion 50f in order to allow exhaust gases to enter outer shield chamber 50d such that outer shield inlet apertures 50h are arranged in a polar array about axis 52. Each outer shield inlet aperture 50h includes a respective inlet passage deflector 50i which is inclined relative to axis 52 such that each inlet passage deflector 50*i* is located within outer shield chamber 50*d* and such that each inlet passage deflector 50*i* is aligned with a respective one of outer shield inlet apertures 50*h* in a direction parallel to axis 52. Inlet passage deflectors 50*i* are preferably integrally formed with outer shield wall inlet portion 50*f* by being a remnant of material from punching outer shield wall inlet portion 50*f* to form outer shield inlet apertures 50*h*. However, instead of severing this remnant from outer shield 50, each inlet passage deflector 50*i* remains attached to outer shield wall inlet portion 50*f* along one edge. As a result, the outer periphery of each inlet passage deflector 50*i* matches an inner periphery of its respective outer shield inlet aperture 50*h*. Finally, in order to allow exhaust gases to exit from outer shield 50, outer shield wall lower portion 50*g* includes an outer shield outlet 50*j* at outer shield second end 50*b* which is circular and centered about axis 52 such that outer shield outlet 50*j* is smaller in diameter than outer shield second inside diameter 50*g*ID.

Inner shield 48 is tubular and extends from an inner shield first end 48*a* to an inner shield second end 48*b* along axis 52 such that inner shield 48 comprises an inner shield wall 48*c* which circumferentially surrounds axis 52, thereby defining an inner shield chamber 48*d* therewithin. Positive electrode 40 and negative electrode 42 of sensing element 34 are located within inner shield chamber 48*d*. Inner shield first end 48*a* is proximal to housing 24 and is fixed thereto, by way of non-limiting example only, by one or more of interference fit, welding, crimping, and the like. Inner shield wall 48*c* includes an inner shield wall upper portion 48*e* which is cylindrical and centered about axis 52 such that inner shield wall upper portion 48*e* has an inner shield first inside diameter 48*e*ID and an inner shield first outside diameter 48*e*OD. Inner shield wall upper portion 48*e* extends from inner shield first end 48*a* to an inner shield wall transition portion 48*f* which is traverse to axis 52 such that inner shield wall transition portion 48*f* extends inward from inner shield wall upper portion 48*e* toward axis 52. Inner shield wall transition portion 48*f* is delimited inward by an inner shield wall lower portion 48*g* which is cylindrical and centered about axis 52 and which extends axially therefrom in a direction opposite from inner shield wall upper portion 48*e* and terminates at inner shield second end 48*b*. Inner shield wall lower portion 48*g* has an inner shield second inside diameter 48*g*ID and an inner shield second outside diameter 48*g*OD such that inner shield second inside diameter 48*g*ID is less than inner shield first inside diameter 48*e*ID and such that inner shield second outside diameter 48*g*OD is less than inner shield first outside diameter 48*g*ID.

An inner shield inlet proximal to inner shield first end 48*a*, illustrated as a plurality of inner shield inlet apertures 48*h*, extends through inner shield wall upper portion 48*e* in order to allow exhaust gases to enter inner shield chamber 48*d* from outer shield chamber 50*d* such that inner shield inlet apertures 48*h* extend through inner shield wall upper portion 48*e* in a direction which is traverse to axis 52 such that inner shield inlet apertures 48*h* extend radially through inner shield wall upper portion 48*e*. While eight inner shield inlet apertures 48*h* have been illustrated herein which are equally spaced, it should be understood that a lesser quantity or a greater quantity may be provided which may or may not be equally spaced. However, in order to allow particulate matter sensor 10 to be insensitive to installation orientation about axis 52 in exhaust conduit 14, it is preferable that each one of inner shield inlet apertures 48*h* is spaced no more than 90° about axis 52 relative to consecutive ones of inner shield inlet apertures 48*h* about the periphery of inner shield 48. In order to allow exhaust gases to exit from inner shield 48, inner shield wall lower portion 48*g* includes an inner shield outlet 48*i*, distal from inner shield first end 48*a*, and located at inner shield second end 48*b*. Inner shield outlet 48*i* is circular and centered about axis 52 such that inner shield outlet 48*i* is smaller in diameter than inner shield second inside diameter 48*g*OD. Inner shield outlet 48*i* is also smaller or equal in diameter to outer shield outlet 50*j*. Exhaust gases which exit from inner shield outlet 48*i* are passed to the portion of outer shield chamber 50*d* which is surrounded by outer shield wall lower portion 50*g*. Positive electrode 40 and negative electrode 42 of sensing element 34 are positioned within inner shield chamber 48*d* such that positive electrode 40 and negative electrode 42 are entirely located axially between inner shield inlet apertures 48*h* and inner shield outlet 48*i* and such that positive electrode 40 and negative electrode 42 are circumferentially surrounded by inner shield wall lower portion 48*g*. Furthermore, it should be noted that positive electrode 40 and negative electrode 42 are not circumferentially surrounded by inner shield wall upper portion 48*e*. Also furthermore, it should be noted that positive electrode 40 and negative electrode 42 are not circumferentially surrounded by inner shield inlet apertures 48*h*. Placement of positive electrode 40 and negative electrode 42 within inner shield wall lower portion 48*g* allows for more of the exhaust gases to be close to positive electrode 40 and negative electrode 42 which is desirable for sensing of particulate matter.

An outer periphery of inner shield wall lower portion 48*g* sealingly engages and circumferentially engages an inner periphery of outer shield wall lower portion 50*g*, thereby separating outer shield chamber 50*d* into an outer shield upper chamber 50*d*1 which is proximal to outer shield first end 50*a* and an outer shield lower chamber 50*d*2 which is distal from outer shield first end 50*a*. Consequently, exhaust gases passing from outer shield inlet apertures 50*h* to outer shield outlet 50*j* must pass through outer shield upper chamber 50*d*1, inner shield chamber 48*d* and outer shield lower chamber 50*d*2 in sequential order. Inner shield wall lower portion 48*g* is gradually reduced in diameter within outer shield wall lower portion 50*g* such that an annular recess 54 is formed radially between inner shield wall lower portion 48*g* and outer shield wall lower portion 50*g* at inner shield second end 48*b*. Furthermore, inner shield outlet 48*i* and outer shield outlet 50*j* are spaced apart along axis 52 by at least the diameter of inner shield outlet 48*i*. Annular recess 54 together with this axial spacing between inner shield outlet 48*i* and outer shield outlet 50*j* and also together with inner shield outlet 48*i* being less than or equal in diameter to outer shield outlet 50*j* prevents liquid water that may accumulate on the inner periphery of outer shield wall lower portion 50*g* from migrating into inner shield chamber 48*d*.

Outer shield wall upper portion 50*e* circumferentially surrounds a portion of inner shield wall lower portion 48*g* such that outer shield first inside diameter 50*e*ID is preferably at least two times inner shield second outside diameter 48*g*OD. This relationship between outer shield first inside diameter 50*e*ID and inner shield second outside diameter 48*g*OD promotes swirling of the exhaust gases which promotes dropping of liquid water that may enter outer shield upper chamber 50*d*1, thereby minimizing the possibility of this liquid water from passing to inner shield chamber 48*d*. This relationship between outer shield first inside diameter 50*e*ID and inner shield second outside diameter 48*g*OD also allows outer shield inlet apertures 50*h* to be maximized in size to allow desired flow through particulate matter sensor 10.

Another feature which minimizes the likelihood of liquid water from entering inner shield chamber 48*d* is an upper annular recess 56 which is formed radially between inner shield wall upper portion 48*e* and housing longitudinal bore 26 and which is located above inner shield inlet apertures 48*h* such that inner shield inlet apertures 48*h* are located between upper annular recess 56 and outer shield inlet apertures 50*h*. Upper annular recess 56 may be annular in shape as illustrated herein. Water that may be propelled upward in outer shield upper chamber 50*d*1 can be carried by momentum into upper annular recess 56 rather than follow the exhaust gases through inner shield inlet apertures 48*h*.

Figure 2:
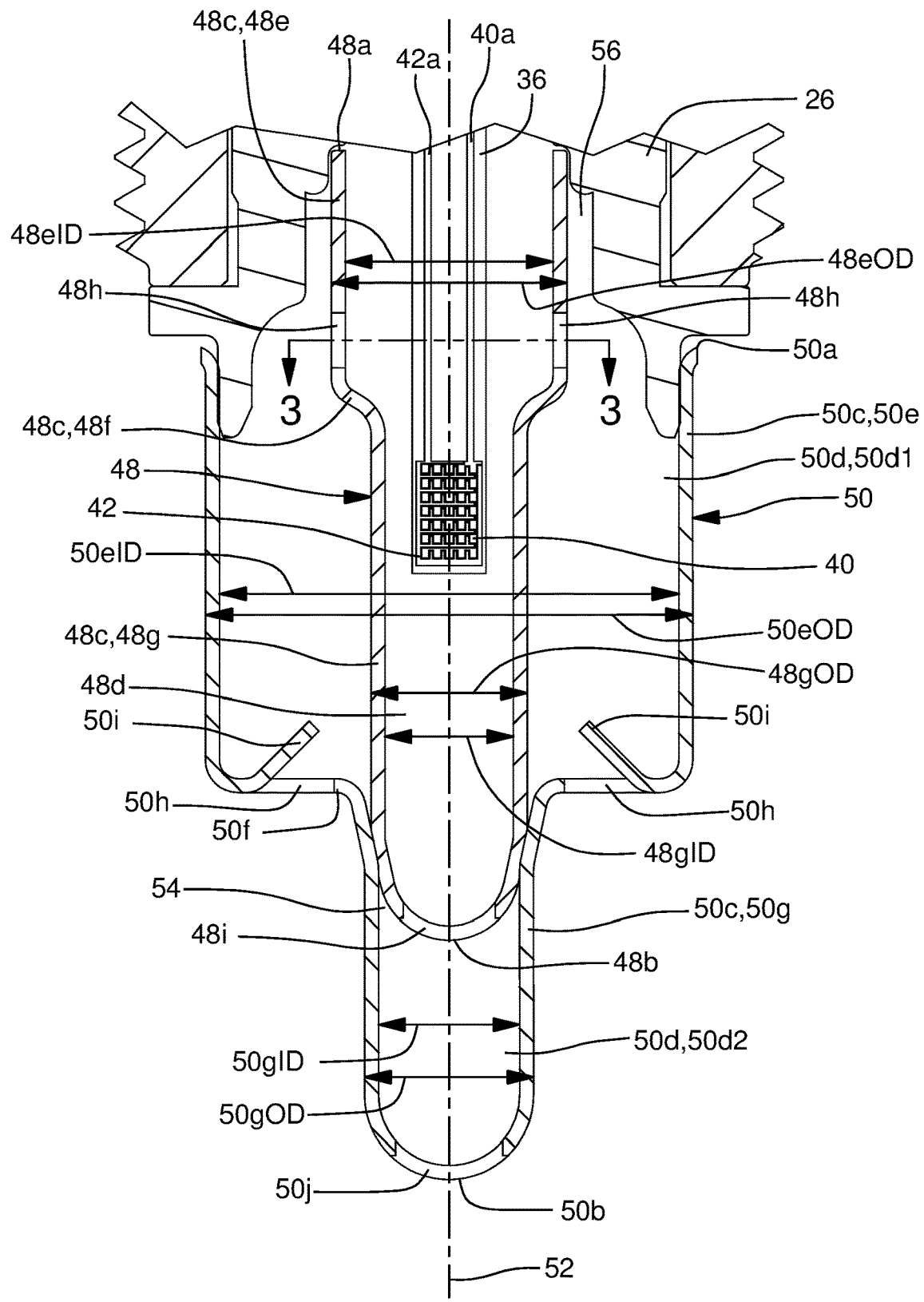
FIG. 2 is an enlarged portion of the particulate matter sensor.
Figure 2A:
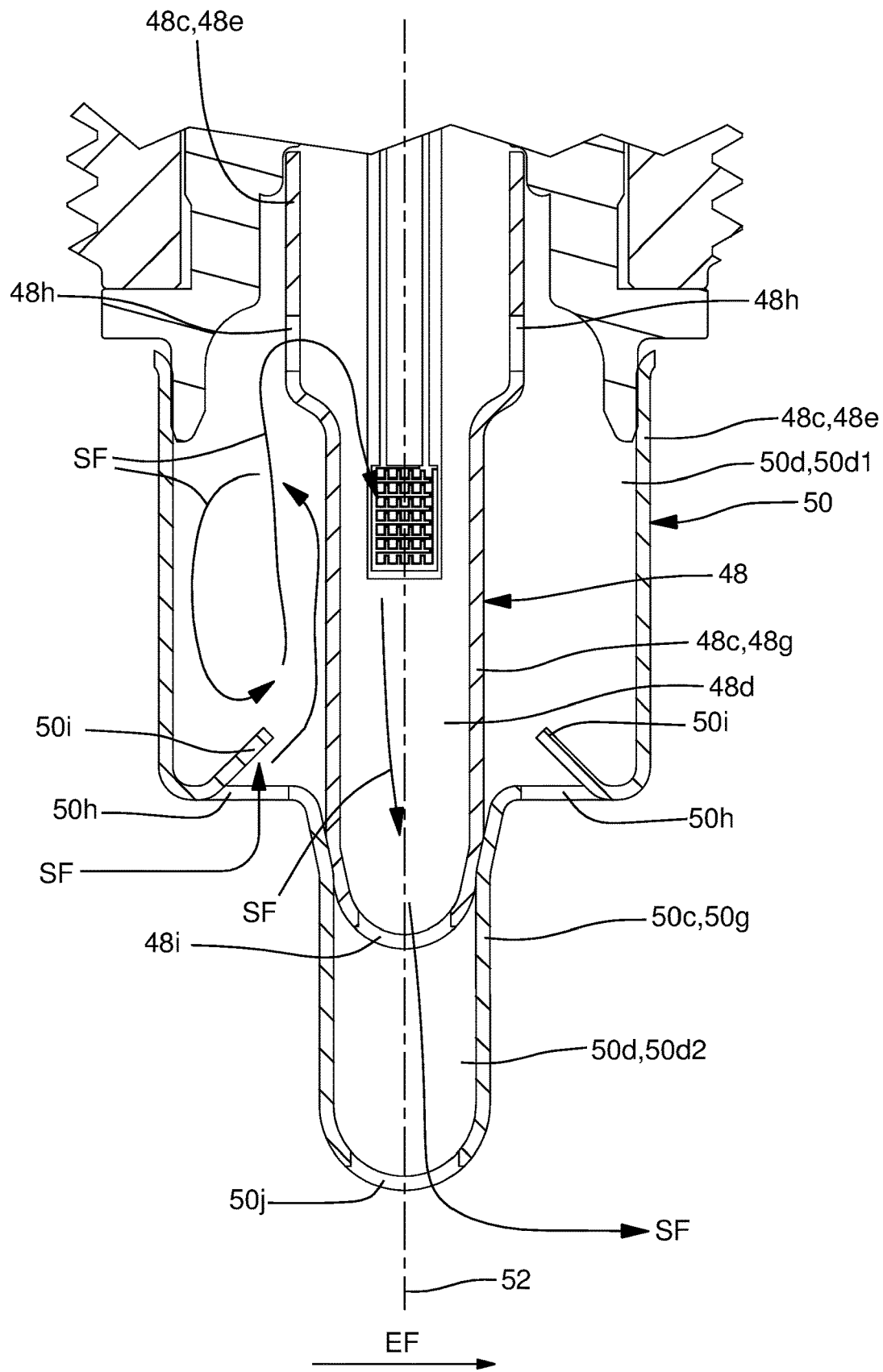
FIG. 2A is the view of FIG. 2, now shown to include flow arrows to illustrate the path of exhaust gases through the particulate matter sensor.
Figure 3:
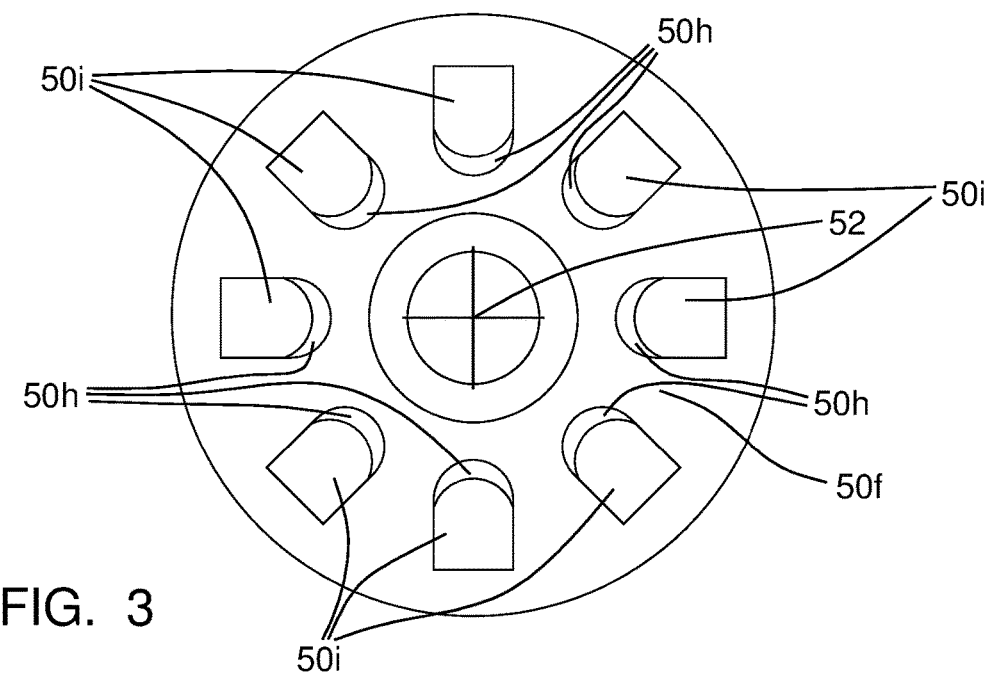
FIG. 3 is an end view of the particulate matter sensor.
Figure 4:
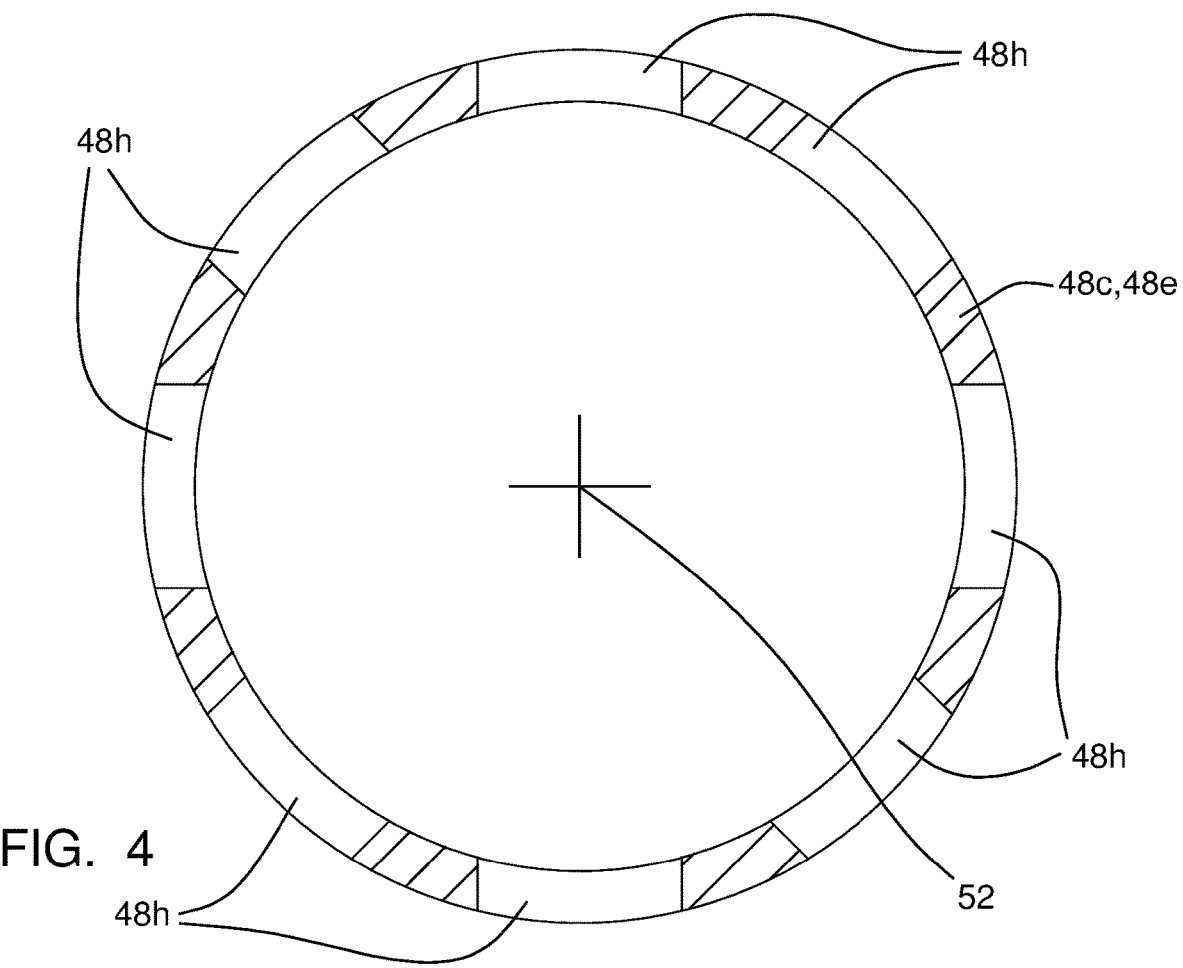
FIG. 4 is a radial cross-sectional view of an inner shield of the particulate matter sensor taken through section line 4-4 of FIG. 2.

Without being bound by any particular theory, in operation, and referring to FIGS. 1 and 2A, exhaust gases flow through exhaust conduit 14 in the direction of arrow EF from upstream end 15 to downstream end 17. A portion of the exhaust gas flow, sensing flow indicated as arrow SF, enters outer shield upper chamber 50*d*1 of outer shield 50 through outer shield inlet apertures 50*h* such that sensing flow SF must turn approximately 90° relative to exhaust flow EF in order to pass through outer shield inlet apertures 50*h*, and consequently, any liquid water in the exhaust gases must make an approximately 90° which is a difficult path for liquid water to take. After passing through outer shield inlet apertures 50*h*, sensing flow SF encounters inlet passage deflectors 50*i* which helps to introduce turbulence to the exhaust gases. The turbulence together with the relationship between inner shield second outside diameter 48*g*OD and outer shield first inside diameter 50*e*ID promotes swirl of liquid water that may be present, thereby promoting dropping of the water which minimizes the likelihood of water entering inner shield chamber 48*d*. Next, the sensing flow enters inner shield chamber 48*d* through inner shield inlet apertures 48*h*. Since inner shield inlet apertures 48*h* extend radially through inner shield wall upper portion 48*e*, sensing flow SF must make another approximately 90° turn in order to enter inner shield chamber 48*d*, thereby minimizing the likelihood of liquid water from entering inner shield chamber 48*d*. Furthermore, since positive electrode 40 and negative electrode 42 are located axially between inner shield inlet apertures 48*h* and inner shield outlet 48*i* and since inner shield inlet apertures 48*h* are not radially aligned with positive electrode 40 and negative electrode 42, liquid water cannot directly impinge positive electrode 40 and negative electrode 42. Sensing flow SF passes over positive electrode 40 and negative electrode 42 where particulate matter can deposit to be sensed. After passing over positive electrode 40 and negative electrode 42, sensing flow SF passes through inner shield outlet 48*i* where it passes to outer shield lower chamber 50*d*2 and finally passes through outer shield outlet 50*j* where sensing flow SF rejoins exhaust flow EF. It should be noted that arrows SF have been provided as an example only, and that portions of the sensing flow may follow other paths which include, but are not limited to, passing through other outer shield inlet apertures 50*h* and other inner shield inlet apertures 48*h*.

Figure 5A:
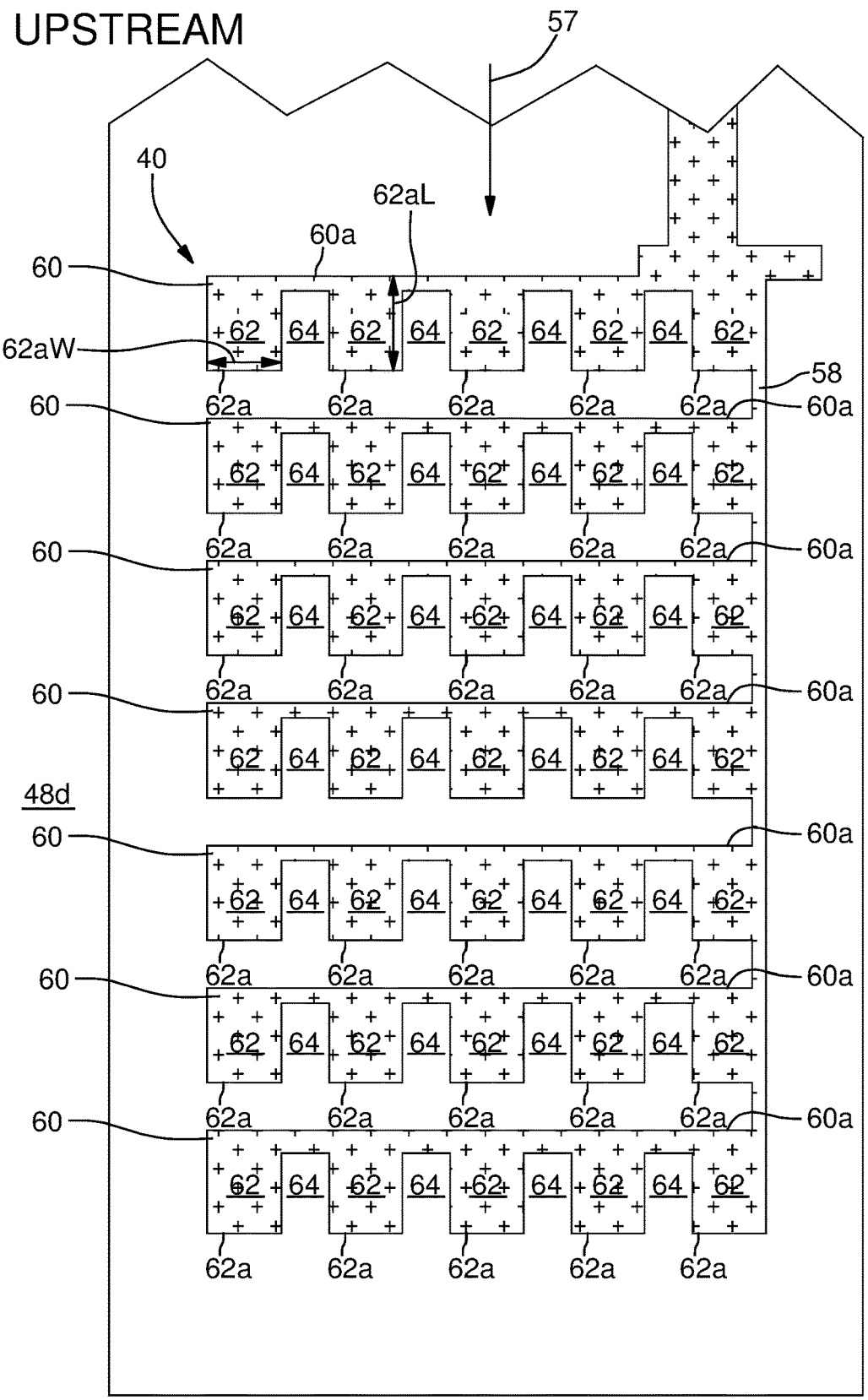
FIG. 5A is the view of FIG. 5 with a negative terminal removed for clarity in describing a positive terminal.
Figure 5B:
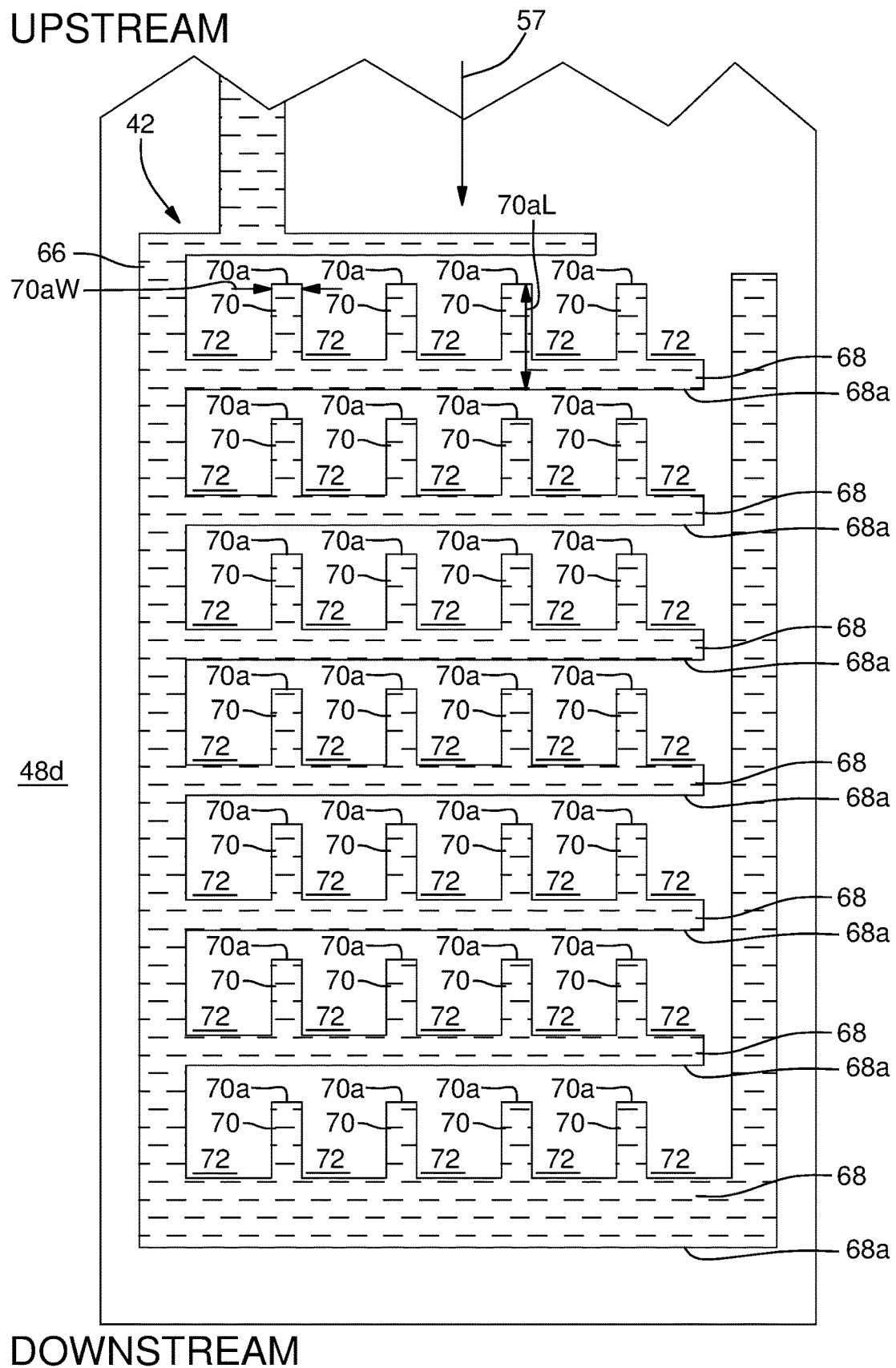
FIG. 5B is the view of FIG. 5 with the positive terminal removed for clarity in describing the negative terminal.

Referring now to FIGS. 5, 5A, and 5B, the pattern of positive electrode 40 and negative electrode 42 which promotes accumulation of particulate matter, thereby reducing the response time of particulate matter sensor 10, is shown enlarged. Positive electrode 40 is connected to a positive side of an electricity source 59 (shown in schematic form only) while negative electrode 42 is connected to a negative side of electricity source 59. It should be noted that a pattern of "+" characters have been applied to positive electrode 40 and a pattern of "−" characters have been applied to negative electrode 42 in FIGS. 5, 5A, and 5B only to provide a better visual distinction therebetween. Furthermore, FIG. 5 illustrates the complete pattern of positive electrode 40 and negative electrode 42 while FIG. 5A has had negative electrode 42 removed for clarity in the description of positive electrode 40 and FIG. 5B has had positive electrode 40 removed for clarity in the description of negative electrode 42. When describing the pattern of positive electrode 40 and negative electrode 42, it is to be understood that the exhaust gases flow through inner shield chamber 48*d* from upstream (proximal to inner shield inlet apertures 48*h*) to downstream (proximal to inner shield outlet 48*i*) in a direction of flow 57 through inner shield 48 which is parallel to axis 52. The Inventors have discovered that while the prior art provides numerous examples of electrode patterns with extensive electrode gaps formed therebetween, much of the electrode gap fails to accumulate particulate matter. Furthermore, the Inventors have discovered the characteristics of the areas of electrode gap 43 which do accumulate particulate matter and have applied this discovery to arrive at the pattern of positive electrode 40 and negative electrode 42 which will now be described.

With particular reference to FIG. 5A, positive electrode 40 includes a positive electrode bus 58 which extends generally parallel to axis 52 which is parallel to the direction of flow 57 through inner shield 48 from upstream to downstream. A plurality of positive electrode branches 60 are arranged in rows in a direction across the direction of flow 57 through inner shield 48, and are preferably perpendicular to the direction of flow 57 through inner shield 48. As illustrated herein, positive electrode branches 60 may be connected in parallel with each other through positive electrode bus 58. Each positive electrode branch 60 includes an upstream edge 60*a*, which is preferably linear for its entire duration from positive electrode bus 58 to its termination, and a plurality of positive electrode extensions 62 which extend downstream therefrom such that positive electrode extensions 62 are separated from each other by a plurality of positive electrode slots 64. Each positive electrode extension 62 extends to a positive electrode extension tip 62*a* having a positive electrode extension tip width 62*a*W in a direction perpendicular to the direction of flow 57 through inner shield 48. As illustrated herein, positive electrode extension tip width 62*a*W for each positive electrode extension 62 may be the same except for those positive electrode extensions 62 which are immediately adjacent to positive electrode bus 58, however, it should be understood that alternatively, positive electrode extension tip width 62*a*W for each positive electrode extension 62 may be the same, or further alternatively, positive electrode extension tip width 62*a*W for additional positive electrode extensions 62 may be different from others. Each positive electrode extension 62 has a positive electrode extension length 62*a*L, in a direction parallel the direction of flow 57 through inner shield 48, from its respective positive electrode extension tip 62*a* to upstream edge 60*a* of its respective positive electrode branch 60. As illustrated herein positive electrode extension length 62*a*L for each positive electrode extension 62 may be the same, or alternatively, some positive electrode extensions 62 may have its positive electrode extension length 62*a*L be different from others.

Now with particular reference to FIG. 5B, negative electrode 42 includes a negative electrode bus 66 which extends generally parallel to the direction of flow 57 through inner shield 48 from upstream to downstream. A plurality of negative electrode branches 68 are arranged in rows in a direction across the direction of flow 57 through inner shield 48, and are preferably perpendicular to the direction of flow 57 through inner shield 48. As illustrated in the figures, positive electrode branches 60 and negative electrode branches 68 are arranged in an alternating pattern such that each pair of adjacent positive electrode branches 60 is separated by a respective negative electrode branch 68. Also as illustrated herein, negative electrode branches 68 may be connected in parallel with each other through negative electrode bus 66. Each negative electrode branch 68 includes a downstream edge 68a which faces toward upstream edge 60a of a respective one of positive electrode branches 60 and which is preferably linear for its entire duration from negative electrode bus 66 to its termination, however, it should be noted that downstream edge 68a of the lower-most negative electrode branch 68 terminates the pattern and therefore does not face toward an upstream edge 60a. Each negative electrode branch 68 also includes a plurality of negative electrode extensions 70 which extend upstream therefrom such that negative electrode extensions 70 are each flanked on each side thereof in a direction perpendicular to the direction of flow 57 through inner shield 48 by a plurality of negative electrode slots 72. Each negative electrode extension 70 extends to a negative electrode extension tip 70a having a negative electrode extension tip width 70aW in a direction perpendicular to the direction of flow 57 through inner shield 48. As illustrated herein, negative electrode extension tip width 70aW for each negative electrode extension 70 may be the same, however, it should be understood that alternatively, negative electrode extension tip width 70aW for some negative electrode extensions 70 may be different from others. Each one of positive electrode extensions 62 extends into a respective one of negative electrode slots 72 and each one of negative electrode extensions 70 extends into a respective one of positive electrode slots 64. Each negative electrode extension 70 has a negative electrode extension length 70aL, in a direction parallel the direction of flow 57 through inner shield 48, from its respective negative electrode extension tip 70a to downstream edge 68a of its respective negative electrode branch 68. As illustrated herein, negative electrode extension length 70aL for each negative electrode extension 70 may be the same with the exception of negative electrode extensions 70 of the lower-most negative electrode branch 68. Alternatively, negative electrode extension length 70aL for each negative electrode extension 70 may be the same or negative electrode extension length 70aL for additional negative electrode extensions 70 may be different.

The Inventors have discovered that particulate matter accumulates most effectively at electrode gap 43, which has an electrode gap width 43W representing the distance separating positive electrode 40 and negative electrode 42, in the area formed between positive electrode extension tips 62a and downstream edge 68a of negative electrode branches 68 where it is important to emphasize that the particulate matter accumulates most effectively at electrode gap 43 where positive electrode 40 is upstream of negative electrode 42. Additionally, the Inventors have discovered that it is important for effective accumulation of particulate matter to maximize the number of discrete positive electrode extension tips 62a for each downstream edge 68a of negative electrode branches 68 while also maximizing the sum of all positive electrode extension tip widths 62aW. Consequently, contrary to the prior art where the widths, i.e. perpendicular to flow, of the interdigitized portions of the positive electrodes and negative electrodes are equal, the sum of all positive electrode extension tip widths 62aW is greater than the sum of all negative electrode extension tip widths 70aW. Preferably, the sum of all positive electrode extension tip widths 62aW is at least 1.5 times greater than the sum of all negative electrode extension tip widths 70aW. Furthermore, an average of positive electrode extension tip width 62aW for all positive electrode extensions 62 is less than eight times electrode gap width 43W. In this way, accumulation of particulate matter can be optimized and response time of particulate matter sensor 10 is minimized. In order to minimize portions of electrode gap 43 which do little to promote accumulation of particulate matter, thereby increasing area for portions of electrode gap 43 which do promote accumulation of particulate matter, a sum of negative electrode extension length 70aL for all negative electrode extensions 70 is less than two times a sum of positive electrode extension length 62aL for all positive electrode extensions 62.

In testing of particulate matter sensor 10, it has been found that the pattern of positive electrode 40 and negative electrode 42 as described herein provided a response time of 105 seconds which is 26% faster than the fastest currently available particulate matter sensors, which as mentioned previously is currently 143 seconds, and meets the response time requirements of engine and vehicle manufacturers to be 110 seconds or less.

While this invention has been described in terms of preferred embodiments thereof, it is not intended to be so limited, but rather only to the extent set forth in the claims that follow.

We claim:

1. A particulate matter sensor for sensing particulate matter present in exhaust gases flowing in an exhaust conduit for an internal combustion engine, said particulate matter sensor comprising:

a shield with a chamber therein, said shield having an inlet through which exhaust gases enter said chamber and an outlet through which exhaust gases exit said chamber such that exhaust gases pass from said inlet to said outlet in a direction of flow through said shield from upstream to downstream; and a sensing element having a positive electrode and a negative electrode located within said shield between said inlet and said outlet such that said positive electrode is separated from said negative electrode by an electrode gap which electrically isolates said positive electrode from said negative electrode;

wherein said positive electrode includes a plurality of positive electrode branches arranged in rows across said direction of flow through said shield and including a plurality of positive electrode extensions extending downstream therefrom such that said plurality of positive electrode extensions are separated from each other by a plurality of positive electrode slots and such that each of said plurality of positive electrode extensions extends to a positive electrode extension tip having a positive electrode extension tip width in a direction perpendicular to said direction of flow through said shield;

wherein said negative electrode includes a plurality of negative electrode branches arranged in rows across said direction of flow through said shield alternating with said plurality of positive electrode branches and including a plurality of negative electrode extensions extending upstream therefrom such that said plurality of negative electrode extensions are each flanked on each side thereof in a direction perpendicular to said direction of flow through said shield from each other by a plurality of negative electrode slots and such that each of said plurality of negative electrode extensions extends to a negative electrode extension tip having a negative electrode extension tip width in a direction perpendicular to said direction of flow through said shield;

wherein each one of said plurality of positive electrode extensions extends into a respective one of said plurality of negative electrode slots and each one of said plurality of negative electrode extensions extends into a respective one of said plurality of positive electrode slots; and wherein a sum of said positive electrode extension tip width for said plurality of positive electrode extensions is greater than a sum of said negative electrode extension tip width for said plurality of negative electrode extensions.

2. The particulate matter sensor as in claim 1, wherein said sum of said positive electrode extension tip widths is at least 1.5 times greater than said sum of said negative electrode extension tip widths.

3. The particulate matter sensor as in claim 1, wherein:

each one of said plurality of positive electrode extensions has a positive electrode extension length, in a direction parallel to said direction of flow through said shield, from said positive electrode extension tip to an upstream edge of its respective positive electrode branch;

each one of said plurality of negative electrode extensions has a negative electrode extension length, in a direction parallel to said direction of flow through said shield from said negative electrode extension tip to a downstream edge of is respective negative electrode branch; and a sum of said negative electrode extension length for each of said plurality of negative electrode extensions is less than two times a sum of said positive electrode extension length for each of said plurality of positive electrode extensions.

4. The particulate matter sensor as in claim 3, wherein an average of said positive electrode extension tip width for said plurality of positive electrode extensions is less than eight times than a width of said electrode gap.

5. The particulate matter sensor as in claim 1, wherein an average of said positive electrode extension tip width for said plurality of positive electrode extensions is less than eight times a width of said electrode gap.

* * * * *